Patented Sept. 8, 1936

2,053,653

UNITED STATES PATENT OFFICE 2,053,653

PYROPHOSPHORIC ACID ESTERS OF HIGHER ALIPHATIC ALCOHOLS AND PROCESS OF PREPARING THE SAME

Karl Butz, Chemnitz, Saxony, Germany, assignor, by mesne assignments, to American Hyalsol Corporation, Wilmington, Del., a corporation of Delaware No Drawing. Application September 27, 1933, Serial No. 691,245. In Germany September 27, 1932

13 Claims. (Cl. 260—99.20)

The invention is concerned with new stabilizing agents for peroxide solutions and a process for producing the said agents.

It has been discovered, that the soluble salts of acid esters derived from high molecular alcohols and pyrophosphoric acid have excellent stabilizing properties in solutions of peroxides used as bleaching and disinfecting agents, that is to say, they regulate and slacken down the evolving of oxygen. The new agents are by far more effective than the alkali metal salts of pyrophosphoric acid, which are already known as stabilizing agents for peroxide solutions used for bleaching and/or disinfecting purposes. A great advantage is also the practically neutral reaction of the new stabilizing agents, whilst a solution of sodium pyrophosphate, which was hitherto mostly used, has a rather strong alkaline reaction. This is important especially for the bleaching of wool, hair and feathers.

The production of the new stabilizing agents can be performed by reacting a high molecular alcohol with pyrophosphoric acid at ordinary or slightly elevated temperatures, if desired in the presence of organic solvents, adding water, separating the watery layer from the solvent layer and neutralizing by means of inorganic or organic strong bases, such as aliphatic or heterocyclic amines.

It is also possible to produce first the acid sulphuric acid esters of the higher alcohols by reacting said alcohols with a sulphating reagent and then reacting the acid sulphuric acid ester at elevated temperatures with a water solution of an inorganic soluble pyrophosphate.

Suitable alcohols are the alcohols of the general formulae

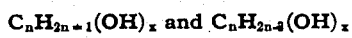

wherein "$n$" means more than 5 and "$x$" means 1 to n. Such alcohols are for example: decanol-1, dodecanol-1, hexadecanol-1, octadecanol-1, octadecanediol-1,12, decandiol-1,10, undecen-11-ol-1, octadecen-12-ol-1 (oleyl alcohol), linoleyl alcohol, ricinoleyl alcohol, alcohols isolated from the neutral part of the oxidation products of paraffin. Other suitable alcohols are alcohols derived from resinic acids or naphthenic acids by replacement of the COOH group by the group $CH_2OH$, aromatic alcohols such as benzyl alcohol and its homologues, and hydroaromatic alcohols such as cyclohexanol and its homologues.

Suitable solvents for the reaction of alcohols with pyrophosphoric acid are benzene, petroleum spirit, halogen hydrocarbons, ketones.

Suitable pyrophosphates for reacting with acid sulphuric acid esters of alcohols are sodium pyrophosphate, potassium pyrophosphate, ammonium pyrophosphate, pyridine pyrophosphate, trimethylamine pyrophosphate.

A temperature from 40 to 100° C. is often found suitable. It depends on the molecular weight and reactivity of the alcohol used.

The new stabilizing agents can be used in bleaching and/or disinfecting liquors according to the following example:

The wool which is to be bleached is soaked for five hours at 50° C. in 8 times its own weight of a solution of 30 litres of hydrogen peroxide (40%)

1 kg. of the crystallized sodium salt of dodecyl alcohol pyrophosphoric acid ester 1 litre concentrated ammonia solution.

The bleached wool is very white and has a soft feel, whilst the consumption of $H_2O_2$ is very low.

Other animal or vegetables fibres can be bleached in an analogous manner.

I claim:

1. The process of producing agents suitable for stabilizing peroxide solutions consisting in reacting a compound selected from the group of high molecular alcohols with more than five carbon atoms in the molecule and their sulphuric acid esters with a compound selected from the group of pyrophosphoric acid and its water-soluble salts.

2. The process of producing agents suitable for stabilizing peroxide solutions consisting in reacting a compound selected from the group of high molecular alcohols with more than five carbon atoms in the molecule and their sulphuric acid esters with a compound selected from the group of pyrophosphoric acid and its water-soluble salts at elevated temperature.

3. The process of producing agents suitable for stabilizing peroxide solutions consisting in reacting a compound selected from the group of high molecular alcohols with more than five carbon atoms in the molecule and their sulphuric acid esters with a compound selected from the group of pyrophosphoric acid and its water-soluble salts in the presence of an organic solvent capable of dissolving the alcohol.

4. The process of producing agents suitable for stabilizing peroxide solutions consisting in reacting a compound selected from the group of high molecular alcohols with more than five carbon atoms in the molecule and their sulphuric acid esters with a compound selected from the group of pyrophosphoric acid and its water-soluble salts at elevated temperatures in the presence of a solvent capable of dissolving the alcohol.

5. The process which comprises reacting an alcohol $C_nH_{2n+1}OH$ wherein "$n$" is more than 5, with pyrophosphoric acid at 50° C. in presence of petroleum ether, adding water, separating the organic solvent from the watery layer and neutralizing the acid ester formed by means of sodium hydroxide solution.

6. The process which comprises reacting acid dodecyl sulphuric acid ester with sodium pyrophosphate dissolved in water, at temperatures between 60 and 80° C.

7. An acid pyrophosphoric acid ester derived from a high molecular alcohol containing more than five carbon atoms in its molecule.

8. A water soluble salt of an acid ester of pyrophosphoric acid derived from a high molecular alcohol containing more than five carbon atoms in its molecule.

9. A salt of an acid ester of pyrophosphoric acid derived from a high molecular aliphatic alcohol containing more than five carbon atoms in its molecule.

10. The method of preparing agents adapted for the stabilization of aqueous solutions of peroxide bleaching compounds which comprises reacting an alcohol containing more than five carbon atoms in the molecule with pyrophosphoric acid and neutralizing the resulting reaction mass to form a salt.

11. The method described in claim 10 wherein the alcohol treated is a normal primary aliphatic alcohol.

12. The method described in claim 10 wherein the alcohol treated is a hydrocyclic alcohol.

13. The method of preparing agents adapted for the stabilization of aqueous solutions of peroxide bleaching compounds which comprises reacting a sulphuric acid ester of an alcohol having more than five carbon atoms in the molecule with a water-soluble salt of pyrophosphoric acid.

KARL BUTZ.